H. Selick.
Plow.

N° 95,386. Patented Sep. 28, 1869.

Witnesses
Sydney E. Smith
W. Morris Smith

Inventor
Henry Selick
by Attorneys
Brown, Combs & Co

UNITED STATES PATENT OFFICE.

HENRY SELICK, OF LEWISTOWN, PENNSYLVANIA.

IMPROVEMENT IN PLOWS.

Specification forming part of Letters Patent No. 95,386, dated September 28, 1869.

*To all whom it may concern:*

Be it known that I, HENRY SELICK, of Lewistown, in Mifflin county and State of Pennsylvania, have invented a new and useful Improvement in Plows; and I do hereby declare that the following is a full, clear, and exact description of the same, reference being had to the accompanying drawings, through letters of reference marked thereon, forming part of this specification, and in which—

Figure 1:
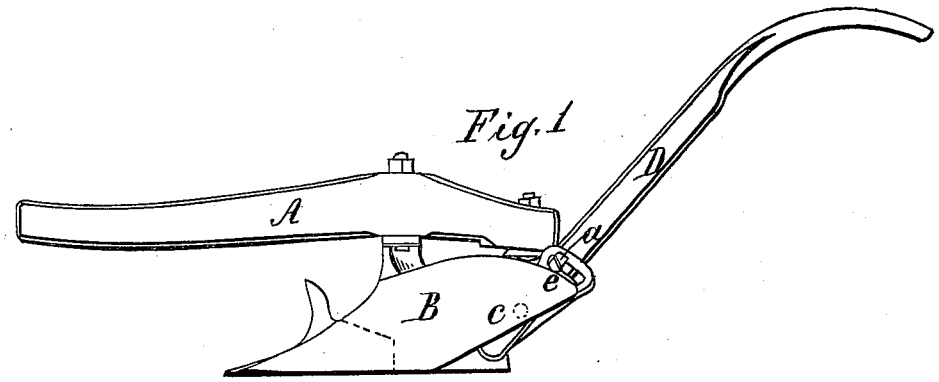
Figure 2:
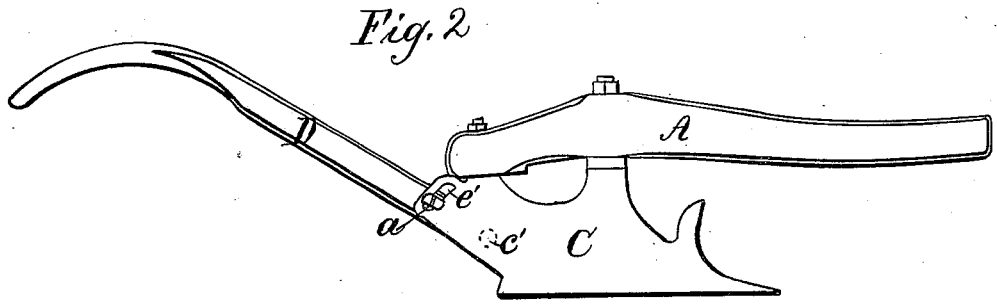

Figure 1 represents an elevation of a plow on the mold-board side, and embracing my improvement. Fig. 2 is an elevation of the reverse or land side of the same.

The same letters appearing on both figures indicate like parts.

In the ordinary construction of plows, great inconvenience and loss of effective labor are experienced from the fact that the implement is adapted for use by a man of ordinary or medium height, so that when used by a small man the handles are inconveniently high, and when by a tall one they are too low, so that neither can handle it with proper effect without an undue expenditure of physical force. Various means have been devised to remedy this evil, such as jointing the handles at the upper part, so that they might be bent or crooked up or down, or, when they are attached to the beam, by connecting the latter in an adjustable manner to the plow, which are both objectionable, for reasons unnecessary to state here.

To remedy these inconveniences is the object of my invention; and it consists in pivoting the handles at their lower ends, the one to the mold-board, and the other to the landside of the plow, and providing a secondary point of connection, to effect rigidity of attachment, by bolts passing through them, and through curvilinear slots in the upper rear portions of the mold-board and landside.

Referring to the drawings, A represents the beam, B the mold-board, and C the landside, of a plow, which may be constructed in any of the ordinary forms. To the heel or lower portion of the mold-board and landside are pivoted, by bolt, or otherwise, as represented at $c$ $c'$, the handles D, and at the upper rear extremities of said mold-board and landside are curvilinear slots $e$ $e'$, which are in the form of the arc of a circle around the points $c$ $c'$, and through each of which and its respective handle is passed a locking-bolt, $a$, by the tightening of which the handles may be secured at any desired elevation. A series of holes arranged in the same curvilinear lines might be substituted for the slots $e$ $e'$.

By this construction the same plow may be used by a short or tall person with equal facility and without unnecessary expenditure of manual labor.

What I claim as new, and desire to secure by Letters Patent, is—

1. The slots or holes $e$ $e'$, arranged in the rear end of the mold-board and landside of a plow, in the arc of a circle described from the pivoted point $a$, at which the handles are attached, as and for the purpose set forth.

2. The attachment of the handles D to the mold-board and landside of a plow, in the manner and for the purpose specified.

HENRY SELICK.

Witnesses:
SYDNEY E. SMITH,
W. MORRIS SMITH.